(12) United States Patent
Gomes

(10) Patent No.: US 10,585,730 B1
(45) Date of Patent: Mar. 10, 2020

(54) ENQUEUE-RELATED PROCESSING BASED ON TIMING OUT OF AN ATTEMPTED ENQUEUE

(71) Applicant: INTERNATIONAL BUSINESS MACHINES CORPORATION, Armonk, NY (US)

(72) Inventor: Louis P. Gomes, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/142,089

(22) Filed: Sep. 26, 2018

(51) Int. Cl.
  *G06F 9/54* (2006.01)
  *G06F 9/52* (2006.01)

(52) U.S. Cl.
  CPC .............. *G06F 9/546* (2013.01); *G06F 9/526* (2013.01)

(58) Field of Classification Search
  None
  See application file for complete search history.

(56) References Cited

U.S. PATENT DOCUMENTS

| | | | | |
|---|---|---|---|---|
| 4,740,887 A | * | 4/1988 | Rutenberg | ............... G06F 11/00 114/23 |
| 6,442,634 B2 | | 8/2002 | Bronson et al. | |
| 8,010,843 B2 | | 8/2011 | Righi et al. | |
| 8,233,392 B2 | | 7/2012 | Samuels et al. | |
| 2003/0158955 A1 | * | 8/2003 | Minear | ................... G06F 16/10 709/230 |
| 2017/0264579 A1 | * | 9/2017 | Fang | ....................... H04L 51/12 |

OTHER PUBLICATIONS

Annaratone et al., "The Warp Computer: Architecture, Implementation, and Performance", IEEE Transactions on Computers vol. C-36. No. 12 (Dec. 1987).
Kim et al., "Access Time Control for TCP Fairness in WLANs", DISS, Seoul National University (2006).
Marathe et al., "Analysis of cache-coherence bottlenecks with hybrid hardware/software techniques." ACM Transactions on Architecture and Code Optimization (TACO), vol. 3, No. 4, pp. 390-423 (2006).
Mel, et al., "The NIST Definition of Cloud Computing," National Institute of Standards and Technology, Information Technology Laboratory, Special Publication 800-145, Sep. 2011 (p. 1-7).
IBM Publication, "z/Architecture Principles of Operation," IBM® Publication No. SA22-7832-11, 12th Edition, Sep. 2017, pp. 1-1902.

* cited by examiner

*Primary Examiner* — Craig C Dorais
(74) *Attorney, Agent, or Firm* — Teddi Maranzano, Esq.; Kevin P. Radigan, Esq.; Heslin Rothenberg Farley & Mesiti P.C.

(57) ABSTRACT

Enqueue-related processing is provided based on timing out of an attempted enqueue to a queue, such as to an adjunct processor queue. The processing includes attempting enqueuing a request message to a queue until timing out, where the timing out indicates an unsuccessful enqueuing of the request message. Based on the enqueuing of the request message timing out, the process includes determining a likely cause for the enqueuing being unsuccessful and timing out. Based on determining the likely cause, the process includes performing one or more actions to facilitate enqueue-related processing within the computing environment.

20 Claims, 8 Drawing Sheets

ENQUEUE-RELATED PROCESSING BASED ON TIMING OUT OF AN ATTEMPTED ENQUEUE

BACKGROUND

This invention relates, in general, to facilitating processing within a computing environment, and in particular, to facilitating message queue processing of adjunct processors of the computing environment.

Adjunct processors are processors that are subordinate or alternate to the central processors of a computing (or processing) environment. The interface to an adjunct processor is asynchronous, and queues are employed by an adjunct processor to communicate with the central processors. Request messages are placed in a queue by one or more programs executing on one or more central processors, a tap is issued to indicate new work, the adjunct processor processes the request messages and places replies (i.e., reply messages) in the queue, and the queue is monitored closely for the replies.

SUMMARY

Shortcomings of the prior art are overcome and additional advantages are provided herein through the provision of a computer program product for facilitating enqueue-related processing within a computing environment. The computer program product includes a computer-readable storage medium readable by a processor and storing instructions for performing a method. The method includes attempting enqueuing a request message to a queue until timing out, the timing out indicating an unsuccessful enqueuing of the requested message. Based on the enqueuing of the request message timing out, the method includes determining a likely cause for the enqueuing being deemed unsuccessful and timing out. Further, the method includes performing, based on determining the likely cause, one or more actions to facilitate enqueue-related processing within the computing environment.

In another aspect, a computer system for facilitating enqueue-related processing within a computing environment is provided. The computer system includes a memory, and a processor in communication with the memory. The computer system is configured to perform a method, which includes: attempting enqueuing a request message to a queue until timing out, the timing out indicating an unsuccessful enqueuing of the request message. Further, the method includes determining, based on the enqueuing of the request message timing out, a likely cause of the enqueuing being unsuccessful and timing out; and based on determining the likely cause, performing one or more actions to facilitate enqueue-related processing within the computing environment.

In a further aspect, a method of enqueue-related processing within a computing environment is provided. The method includes attempting enqueuing a request message to a queue until timing out, the timing out indicating an unsuccessful enqueuing of the request message. Further, the method includes determining, based on the enqueuing of the request message timing out, a likely cause for the enqueuing being unsuccessful and timing out, and based on determining the likely cause, performing one or more actions to facilitate enqueue-related processing within the computing environment.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Aspects of the present invention and certain features, advantages and details thereof, are explained more fully below with reference to the non-limiting example(s) illustrated in the accompanying drawings. Descriptions of well-known systems, devices, processing techniques, etc., are omitted so as to not unnecessarily obscure the invention in detail. It should be understood, however, that the detailed description in this specific example(s), while indicating aspects of the invention, is given by way of illustration only, and not by way of limitation. Various substitutions, modifications, additions, and/or other arrangements, within the spirit and/or scope of the underlying inventive concepts will be apparent to those skilled in the art from this disclosure. Note further that numerous inventive aspects and features are disclosed herein, and unless inconsistent, each disclosed aspect or feature is combinable with any other disclosed aspect or feature as desired for a particular application to facilitate, for instance, enqueue-related processing within a computing environment.

The illustrative embodiments may be described below using specific code, designs, architectures, protocols, layouts, schematics, or tools only as examples, and are not limited to the illustrative embodiments. Furthermore, the illustrative embodiments may be described in certain instances using particular software, tools, and data processing environments only as example for clarity of description. The illustrative embodiments may be used in conjunction with other comparable or similarly purposed structures, systems, applications, or architectures. An illustrative management control embodiment may be implemented in hardware, software, or a combination thereof.

The examples in this disclosure are used only for clarity of description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed herein.

One example of a computer system that includes processors that may be used by one or more aspects of the present invention is described with reference to FIG. 1A. In this example, the computer system is part of a computing environment including additional components that may or may not be used by aspects of the present invention.

Figure 1A:
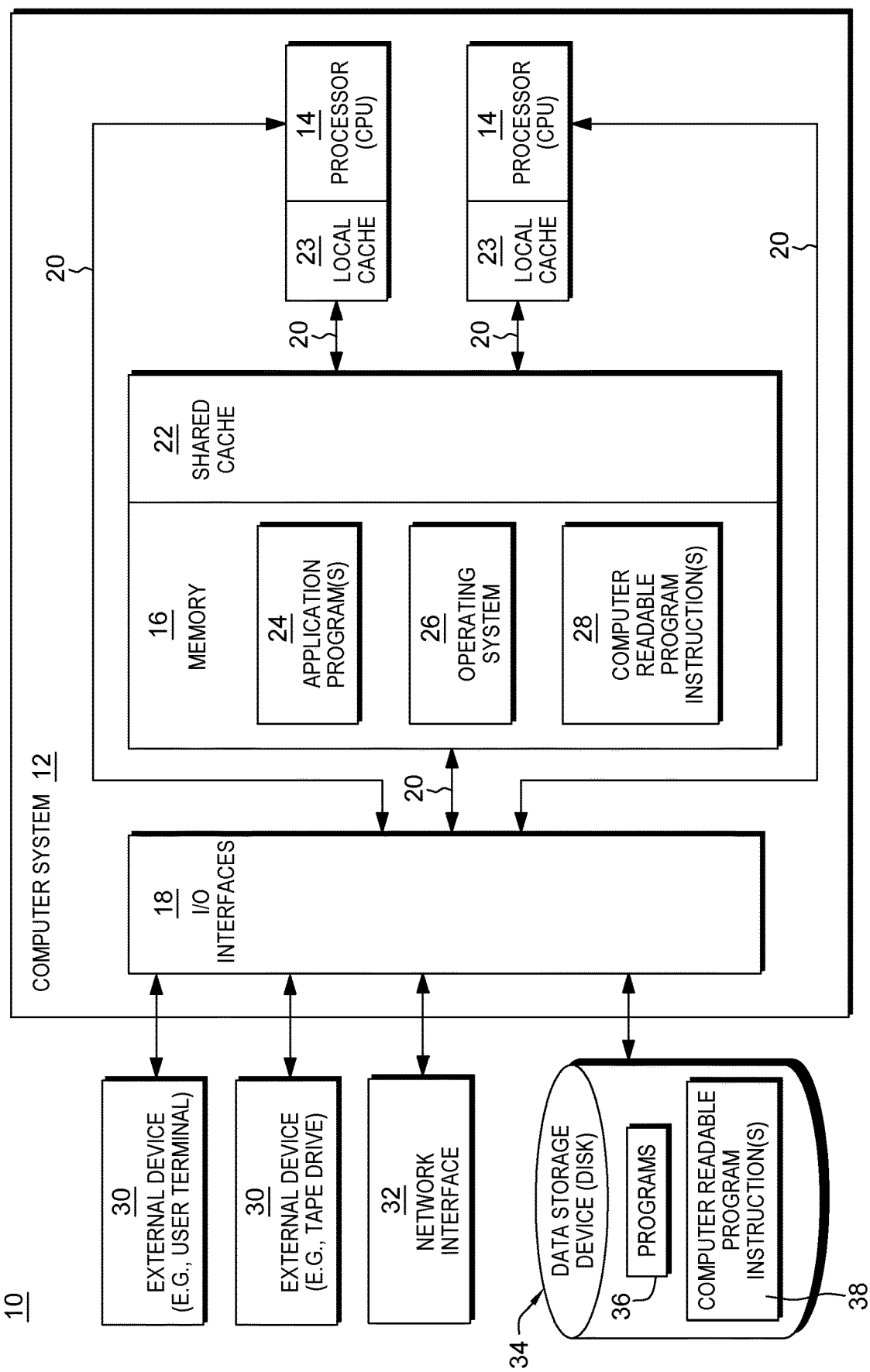
FIG. 1A depicts one example of a computing (or processing) environment to incorporate and use one or more aspects of the present invention.

As shown in FIG. 1A, a computing environment 10 includes, for instance, a computer system 12 shown, e.g., in the form of a general-purpose computing device. Computer system 12 can include, but is not limited to, one or more processors or processing units 14 (e.g., central processing units (CPUs)), a memory 16 (a.k.a., system memory, main memory, main storage, central storage or storage, as examples), and one or more input/output (I/O) interfaces 18, coupled to one another via one or more buses and/or other connections 20.

Bus 20 represents one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 16 can include, for instance, a cache 22, such as a shared cache, which can be coupled to local caches 23 of processors 14. Further, memory 16 can include one or more programs or applications 24, an operating system 26, and one or more computer readable program instructions 28. Computer readable program instructions 28 can be configured to carry out functions of embodiments of aspects of the invention.

Computer system 12 can also communicate via, e.g., I/O interfaces 18 with one or more external devices 30, one or more network interfaces 32, and/or one or more data storage devices 34. Example external devices include a user terminal, a tape drive, a pointing device, a display, etc. Network interface 32 enables computer system 12 to communicate with one or more networks, such as a local area network (LAN), a general wide area network (WAN), and/or a public network (e.g., the Internet), providing communication with other computing devices or systems.

Data storage device 34 can store one or more programs 36, one or more computer readable program instructions 38, and/or data, etc. The computer readable program instructions can be configured to carry out functions of embodiments of aspects of the invention.

Computer system 12 can include and/or be coupled to removable/non-removable, volatile/non-volatile computer system storage media. For example, it can include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with computer system 12. Examples, include, but are not limited to: microcode, device drivers, redundant processing units, external disk drive arrays, RAID systems, tape drives, and data archival storage systems, etc.

Computer system 12 can be operational with numerous other general purpose or special purpose computing system environments or configurations. Examples of well-known computing systems, environments, and/or configurations that may be suitable for use with computer system 12 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

In one example, a processor, such as processor 14, and/or an adjunct processor can execute one or more components to perform one or more aspects of the present invention. These components can be stored in memory, including main memory (e.g., memory 16) and/or one or more caches (e.g., shared cache 22, local cache 23) and/or external storage (e.g., device 34), and can be executed by one or more processors (e.g., processor 14).

Figure 1B:
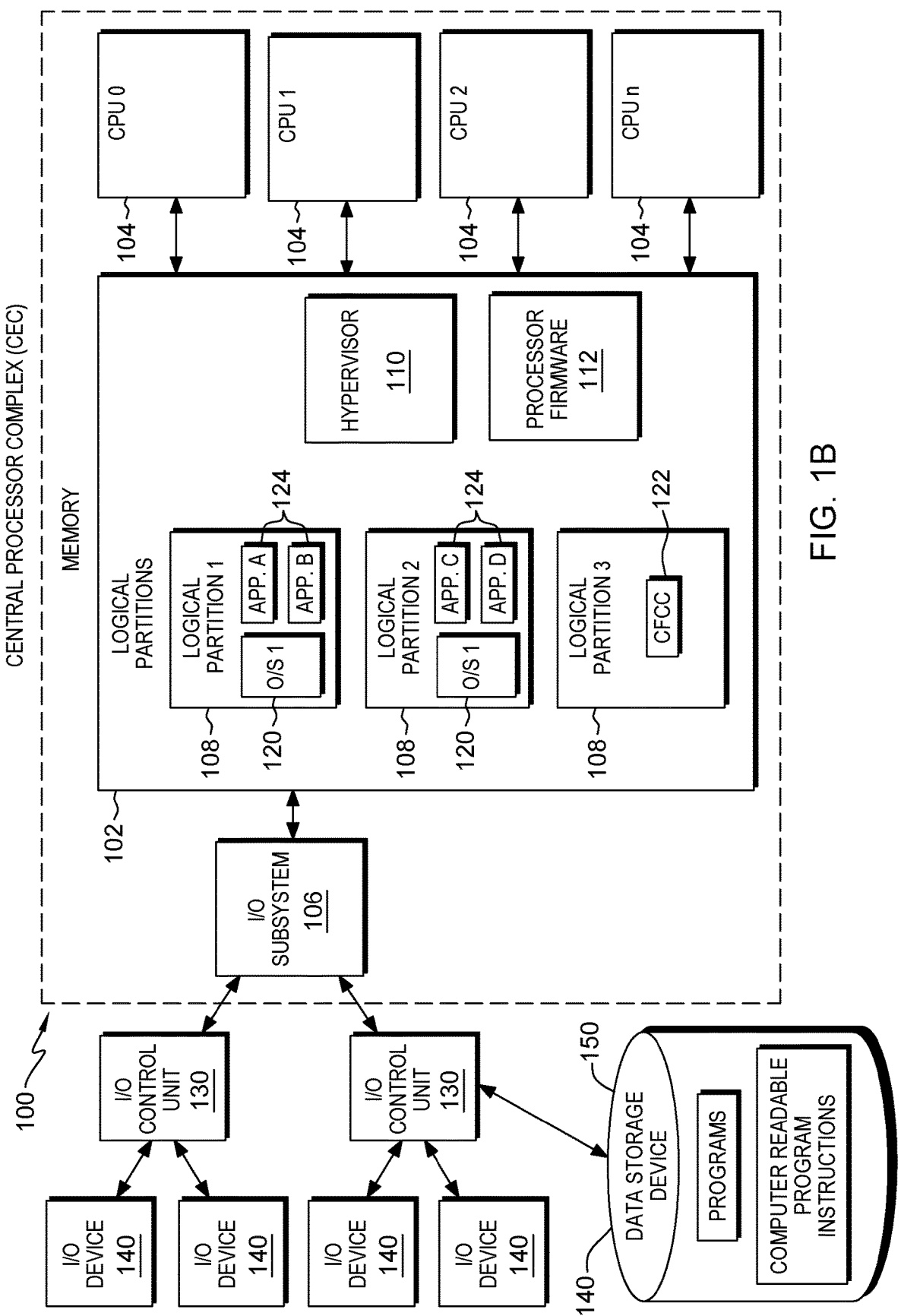
FIG. 1B depicts another embodiment of a computing environment to incorporate and use one or more aspects of the present invention.

Another embodiment of a computing environment to incorporate and use one or more aspects of the present invention is described below with reference to FIG. 1B. In one example, the computing environment of FIG. 1B can be based on the z/Architecture® offered by International Business Machines Corporation, and can include one or more servers, such as, one or more System z servers, also offered by International Business Machines Corporation. One embodiment of the z/Architecture is described in an IBM® publication entitled, "z/Architecture Principles of Operation," IBM® Publication No. SA22-7832-11, $12^{th}$ edition, September 2017, which is hereby incorporated herein by reference in its entirety. The z/Architecture, however, is only one example architecture.

In one example, the computing environment includes a central electronics complex (CEC) 100. CEC 100 includes a plurality of components, such as, for instance, a memory 102 (a.k.a., system memory, main memory, main storage, central storage, storage) coupled to one or more processors (a.k.a., central processing units (CPUs)) 104, and to an input/output subsystem 106.

Memory 102 includes, for example, one or more logical partitions 108, a hypervisor 110 that manages the logical partitions, and processor firmware 112. One example of hypervisor 110 is the Processor Resource/System Manager (PR/SM), offered by International Business Machines Corporation, Armonk, N.Y. As used herein, firmware includes, e.g., the microcode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

Each logical partition 108 is capable of functioning as a separate system. That is, each logical partition can be independently reset, run a guest operating system 120 such as z/OS, offered by International Business Machines Corporation, or other control code 122, such as coupling facility control code (CFCC), and operate with different programs 124. An operating system or application program running in a logical partition appears to have access to a full and complete system, but in reality, only a portion of it is available.

Memory 102 is coupled to processors (e.g., CPUs) 104, which are physical processor resources that can be allocated to the logical partitions. For instance, a logical partition 108 includes one or more logical processors, each of which represents all or a share of a physical processor resource 104 that can be dynamically allocated to the logical partition.

Further, memory 102 is coupled to I/O subsystem 106. I/O subsystem 106 can be a part of the central electronics complex or separate therefrom. It directs the flow of information between main storage 102 and input/output control units 130 and input/output (I/O) devices 140 coupled to the central electronics complex.

Many types of I/O devices may be used. One particular type is a data storage device 150. Data storage device 150 can store one or more programs 152, one or more computer readable program instructions 154, and/or data, etc. The computer readable program instructions can be configured to carry out functions of embodiments of aspects of the invention.

Central electronics complex 100 can include and/or be coupled to removable/non-removable, volatile/non-volatile computer system storage media. For example, it can include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with central electronics complex 100. Examples include, but are not limited to: microcode, device drivers, redundant processing units, external disk drive arrays, RAID systems, tape drives, and data archival storage systems, etc.

Further, central electronics complex 100 can be operational with numerous other general purpose or special purpose computing system environments or configurations. Examples of well-known computing systems, environments, and/or configurations that may be suitable for use with central electronics complex 100 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Figure 2A:
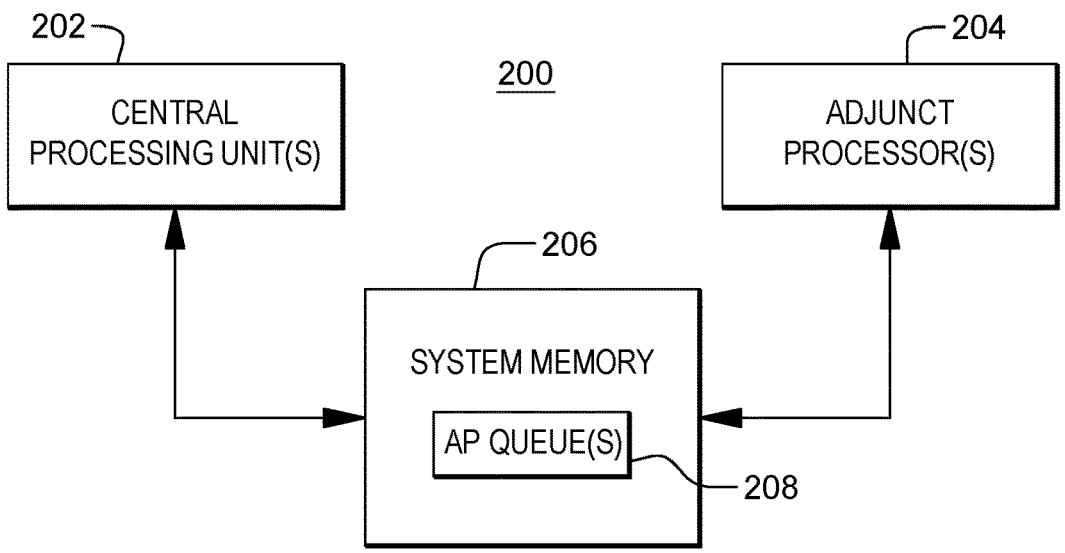
FIG. 2A depicts another example of a computing environment to incorporate and use one or more aspects of the present invention.

A further embodiment of a computing or processing environment 200 to incorporate and use one or more aspects of the present invention is described with reference to FIG. 2A. In one example, computing environment 200 includes at least one central processing unit 202 and at least one adjunct processor (AP) 204. The central processing unit(s) is the central processor of the environment, while the adjunct processor(s) is a subordinate or alternate processor(s) that performs work for one or more of the central processing units. By way of example only, the adjunct processor(s) can be on, or associated with, a cryptography card, in one or more implementations discussed further below. Each central processing unit can be coupled to main memory and to one or more I/O devices (not shown).

The central processing unit(s) 202 and adjunct processor (s) 204 are coupled to a system memory 206. As one example, this memory is, for instance, a hardware system area, which is indirectly accessible and not visible to programs executing on the central processing unit. (Indirectly accessible herein means that the hardware system area or queue is only accessible by specific limited instructions and not otherwise accessible (e.g., cannot load into it, programs are unaware of addresses, etc.)). Located within the system memory are one or more adjunct processor queues 208. These queues 208 are not directly visible from user programs and are instead considered part of the machine (i.e., the machine that includes the central processing unit(s), system memory and adjunct processor(s)). The central processing unit(s) has access to the queues in system memory by, for instance, issuing instructions to place requests on the queue, and/or to remove replies from the queue. The adjunct processor, however, does have direct access to the queues, and is responsible for taking requests off the queue, processing the requests, and placing replies to the requests on the queue.

As noted, in one example, the machine can be based on the z/Architecture® offered by International Business Machines Corporation. For instance, the machine is a system z10® enterprise class mainframe offered by International Business Machines Corporation. One embodiment of the z/Architecture® is described in the above-referenced "z/Architecture® Principles of Operation". IBM Publication z/Architecture® and z10® are registered trademarks of International Business Machines Corporation, Armonk, N.Y. Other names used herein may be registered trademarks, trademarks or product names of International Business Machines Corporation or other companies.

Figure 2B:
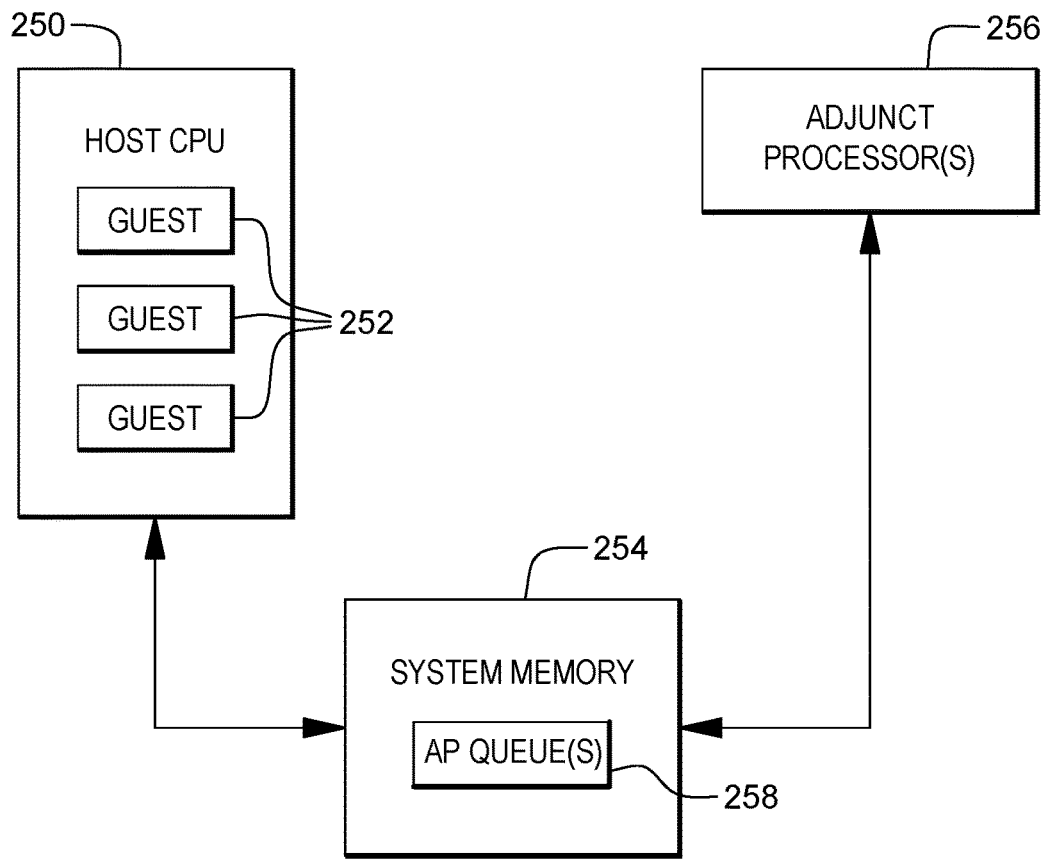
FIG. 2B depicts a further example of a computing environment to incorporate and use one or more aspects of the present invention.

Another embodiment of a computing or processing environment to incorporate and use one or more aspects of the present invention is described with reference to FIG. 2B. In this embodiment, the machine includes virtual support, and there is at least one host central processing unit 250 that includes a plurality of guest central processing units 252. The host central processing unit is coupled to a system memory 254. Additionally, there is at least one adjunct processor 256, which is also coupled to system memory 254. The system memory includes one or more adjunct processor queues 258. Again, in this example, the system memory, and thus, the queues are not visible to user programs.

In various embodiments, the host can dedicate the entire queue to one guest or multiplex the queue among a plurality of guests. If the queue is to be dedicated, then the host CPU (e.g., z/VM® offered by International Business Machines Corporation) can set up the guest CPUs to directly issue requests (e.g., instructions) interpretatively so that there is no host program involvement. However, if the queue is to be shared, then there is a multiplex/demultiplex situation and those requests are intercepted by the host program. The host program reissues those requests on behalf of the guest. Part of the payload of the request is then tagged or has an identifier included therewith, such that when completion of the request is returned, there is a way of knowing which guest is associated with the request. The host program can emulate the response back up to the guest in a way that makes the guest believe it has a dedicated queue, even though the queue is shared.

Although various embodiments of processing environments are described herein, many other environments can incorporate and use one or more aspects of the present invention. For example, other environments can include one or more machines that are logically partitioned and each logical partition is coupled to system memory. Other environments can also benefit from one or more aspects of the present invention.

In accordance with an aspect of the present invention, processing related to the queues in system memory, such as adjunct processor queue(s) 208 and/or adjunct processor queue(s) 258, is facilitated. One embodiment of such processing is described below in detail with reference to FIGS. 3-4B.

As noted, and by way of specific example only, the adjunct processor queue(s) can be one or more queues associated with an adjunct processor (AP) cryptography card. The AP cryptography card has one or more queues for transporting AP messages to and from the card, using the same AP queue. An enqueue AP instruction takes an AP request message from program storage and stores it on the designated AP queue. AP firmware takes the AP request message from the AP queue and sends it to the adjunct processor. The adjunct processor, in turn, processes the AP request message and generates an AP reply message and gives it to the AP firmware. The AP firmware takes the AP reply message from the adjunct processor and stores it in the AP queue. A dequeue AP instruction moves the AP reply message from the designated AP queue to the program storage.

An AP queue has a specified depth, and thus can hold a certain number of AP messages at any given time. The AP queue depth can be obtained by the operating system (OS), as well as a test program testing the AP cryptography card, and can be used to determine the maximum number of AP messages an AP queue can hold at any given time. When the AP request message fills up the AP queue using an enqueue AP instruction, an AP queue full (F) state is returned by the adjunct processor for that AP queue. Once the AP queue is full, the AP queue full (F) state is reported by the adjunct processor for that AP queue until at least one AP reply message is available and removed from the AP queue by the operating system using the dequeue AP instruction.

For instance, assume that the AP queue can hold a maximum of, for instance, eight AP messages, and in an architecture verification process, the test program enqueues seven AP request messages, and none of the AP reply messages have been dequeued from the same AP queue. Since that AP queue can hold eight AP messages, an AP queue full (F) state is not returned since that AP queue is not full, since it currently does not contain eight AP messages. If the test program enqueues another AP request message (eighth AP message), and none of the AP reply messages have been dequeued from the same AP queue, then the AP queue full (F) state is reported by the adjunct processor for that AP queue after the adjunct processor completes the requested enqueue operation. The AP queue full (F) state would be reported by the adjunct processor for that AP queue until at least one AP reply message is generated by the adjunct processor and stored in this AP queue (that is, the AP queue reply-pending (R) state has been entered), and then at least one generated AP reply message is removed from the same AP queue by the operating system using a dequeue AP instruction.

Since there is only one AP queue for both the input and output messages, it is difficult to determine if an AP queue full (F) state is due to a software issue, or deficiency or a hardware issue, because the software does not have enough information from the hardware side. This is complicated in a multiprocessor environment, where multiple programs, such as multiple test programs or multiple test program copies (i.e., multiple threads), can simultaneously enqueue and dequeue AP messages from the same AP queue.

Currently, if one test program copy (thread) enqueues an AP request message and receives an AP queue full (F) state (that is, the enqueue is not successful), then it keeps on trying to enqueue the same AP request message with a timer until either it times out, or successfully enqueues the AP request message (that is, does not see the AP queue full (F) state). If it times out, then the test program could indicate an appropriate enqueue time-out error message and force a program error output for enqueue time-out error analysis and error correction. Since this is a multiprocessor environment, with multiple test programs or multiple test program copies (multiple threads) running, it is assumed that one of the other programs will eventually dequeue one or more AP reply messages, which would allow this test program to finally enqueue its AP request message successfully.

However, there are multiple scenarios where the test program copy (thread) may not be able to enqueue an AP request message because the AP queue full (F) state does not go away (reset), and some of them are due to software issues or deficiencies. Therefore, disclosed herein are new enqueue-related processes that facilitate addressing or overcoming these issues, as well as others. As described herein, in one or more aspects, the processing gathers and inspects various test program states, as well as the AP queue state(s), to determine whether an AP queue full (F) state is due to a software deficiency, and if so, takes appropriate action. It is also assumed that if an AP queue full (F) state is not due to a software deficiency, then, in certain cases, it must be due to a hardware issue, and an error can be reported with this indication as part of the action taken.

Figure 3:
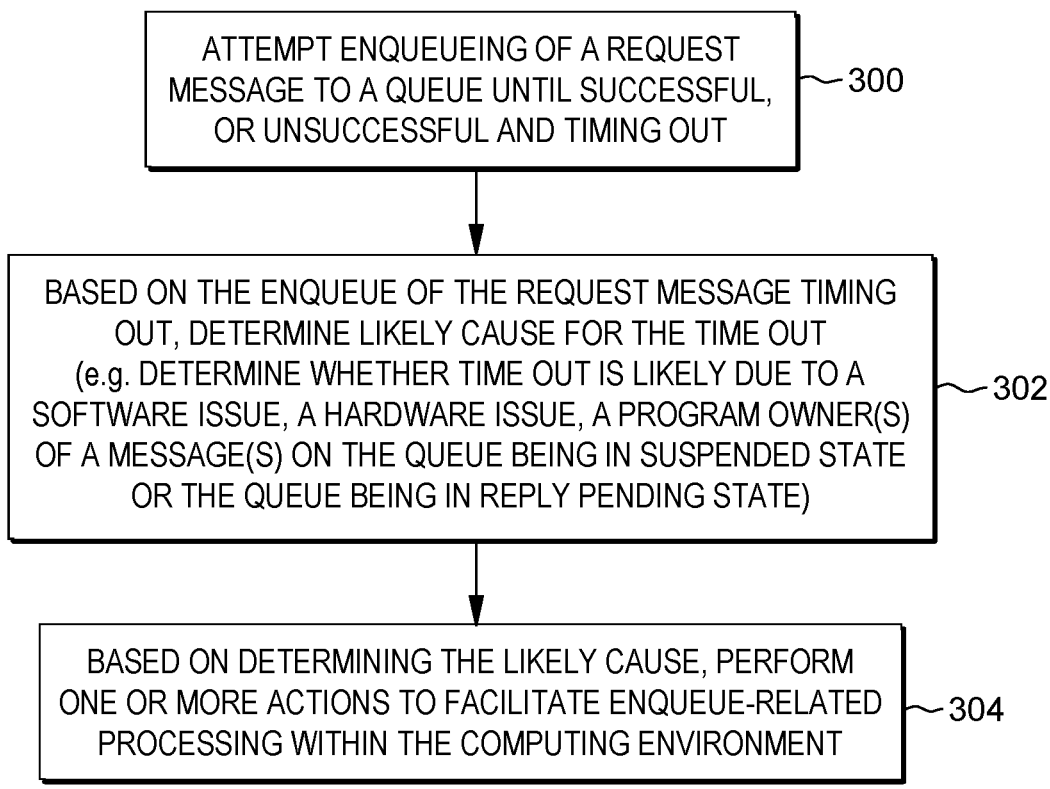
FIG. 3 depicts one embodiment of logic for facilitating enqueue-related processing within a computing environment, in accordance with one or more aspects of the present invention.

Generally stated, disclosed herein are computer program products, systems and methods for facilitating enqueue-related processing within a computing environment. As depicted in FIG. 3, the processing approach includes attempting enqueuing a request message to a queue until successful, or unsuccessful and timing out 300. Based on the enqueue of the request message timing out, a likely cause for the timing out is determined 302. In one or more implementations, determining the likely cause of the enqueue timing out can include determining whether the timing out is likely due to a software issue within the computing environment, a hardware issue within the computing environment, a program owner of a message on the queue being in suspended state, or the queue being in reply-pending state. Further, the process includes, based on determining the likely cause, performing one or more actions to facilitate enqueue-related processing within the computing environment 304.

As noted, in one or more embodiments, the queue is an adjunct processor queue, and advantageously, one or more aspects disclosed herein eliminate returning of an enqueue AP request message time-out when an AP queue full (F) state does not go away (reset) due to one or more software deficiencies. The operating system and test program(s) work together to gather and inspect various test program states, as well as AP queue states, to see of the AP queue full (F) state is due to a software deficiency, and if so, takes appropriate action. It is assumed that if the AP queue full (F) state is not due to a software deficiency, then it must be due to a hardware problem, and an appropriate hardware error can be indicated in certain cases discussed hereinbelow.

In one or more implementations, each machine model might generally allow two different AP card types, one carried forward from a previous machine mode, and one for a current machine model. Further, each AP card can have different modes, and each AP card can be configured to run in one or more modes of the AP card. Also, each AP card mode can use its own unique AP message structures and AP message handling. Therefore, each test program copy (i.e., one program instance) can be designed to run and test only one AP card type in only one mode of the AP card type. Also, the test program copies that run to and test the same AP card type and same mode of the AP card type can be designed to share and use all the configured AP queues to provide stress testing using multiple machine partitions, each with multiple processors.

In operation, the operating system tracks numerous items to eliminate software deficiencies. Each tracked item is grouped for each AP card type and mode. In the case of an AP cryptography card, the operating system determines if the program is a cryptography program based on the cryptography service usage. Further, the operating system can keep track of the cryptography programs that were started, have not been terminated, and are currently running. The operating system can also keep track of the cryptography programs that are currently suspended (in pause state), it also can keep track of the number of AP messages in each configured AP queue, and determine the AP queue full (F) state, as well as an emptiest AP queue (to facilitate certain processing described below).

As described herein, in one or more embodiments, after the test program times out trying to enqueue an AP request message when the AP queue full (F) state does not go away (or reset), it first checks to see of the AP queue full (F) state is correct based on the number of AP messages that are currently on the AP queue. If the AP queue full (F) state is correct, then it checks to see if any of the AP message owners of the AP queue are in suspended state. If none of the AP message owners of the AP queue are in suspended state but the AP queue is in reply-pending (R) state, then the test program first dequeues the pending AP replay message(s), and then tries to re-enqueue the AP request message to the same AP queue. If any of the AP message owners of the AP queue are in suspended state, then it continues to try to enqueue the AP request message until successful, or none of the AP message owners of the AP queue is in suspended state, using the method described below.

In one or more aspects, the test program can look for another AP queue that is not in AP queue full (F) state. If the test program finds another AP queue with a non-full AP queue state, then it can reset the enqueue timer and try to enqueue the AP request message on one of the non-full AP queues until successful or time-out occurs again. Otherwise, it tries to re-enqueue the AP request message to the same AP queue. This process can continue until either the AP request message is enqueued successfully, or all the configured AP queues have been searched, with the AP request message being unable to be successfully enqueued on any one of them. Based on all the configured AP queues having been searched, and (for instance) the test program being unable to enqueue the AP request message on any one of them, then an error indication can be indicated relaying that the enqueue AP request message time-out was due to an AP queue full (F) state not going away (that is, not resetting).

Figure 4A:
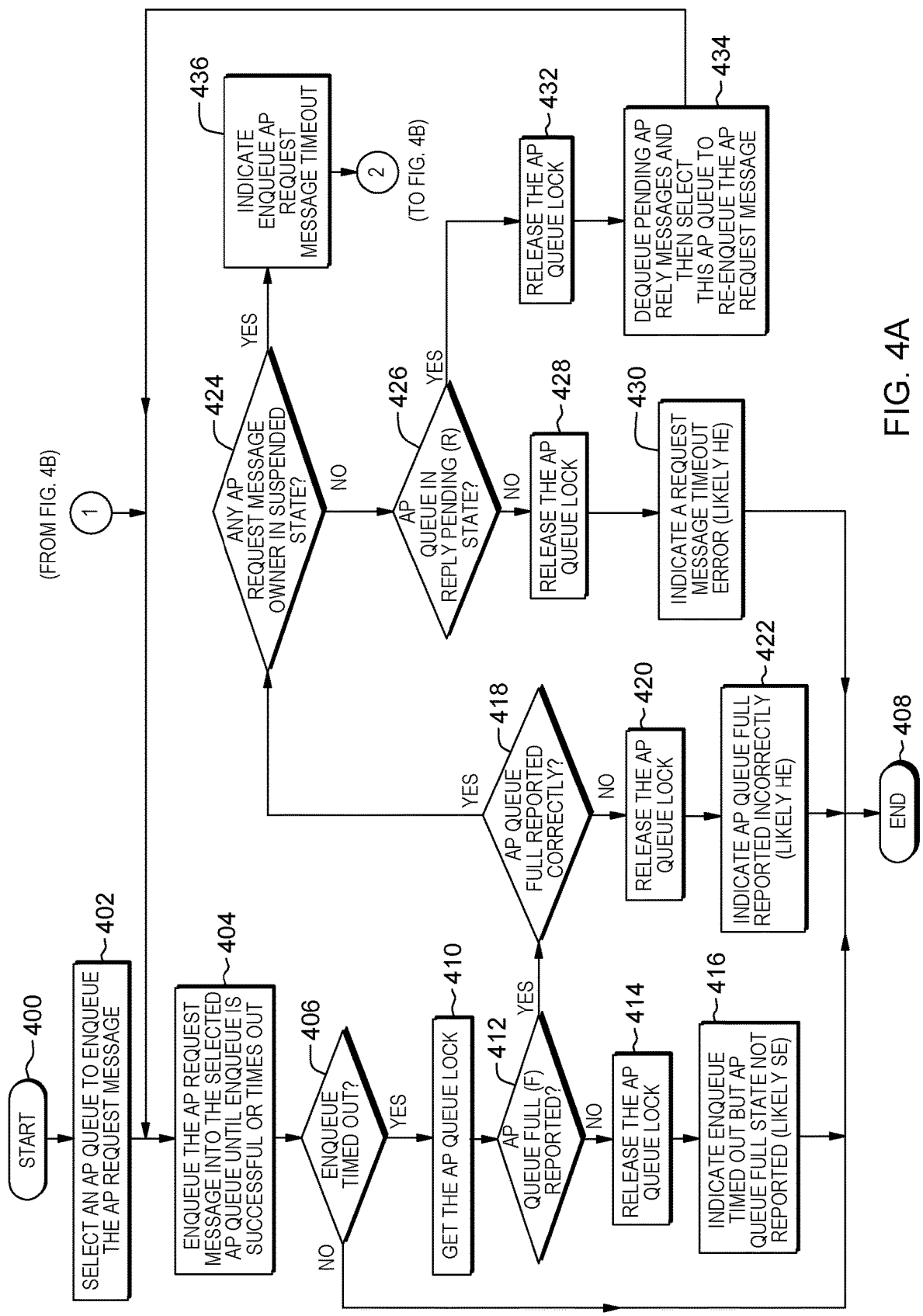
FIGS. 4A-4B depict a more detailed embodiment of logic for facilitating enqueue-related processing within a computing environment, in accordance with one or more aspects of the present invention.
Figure 4B:
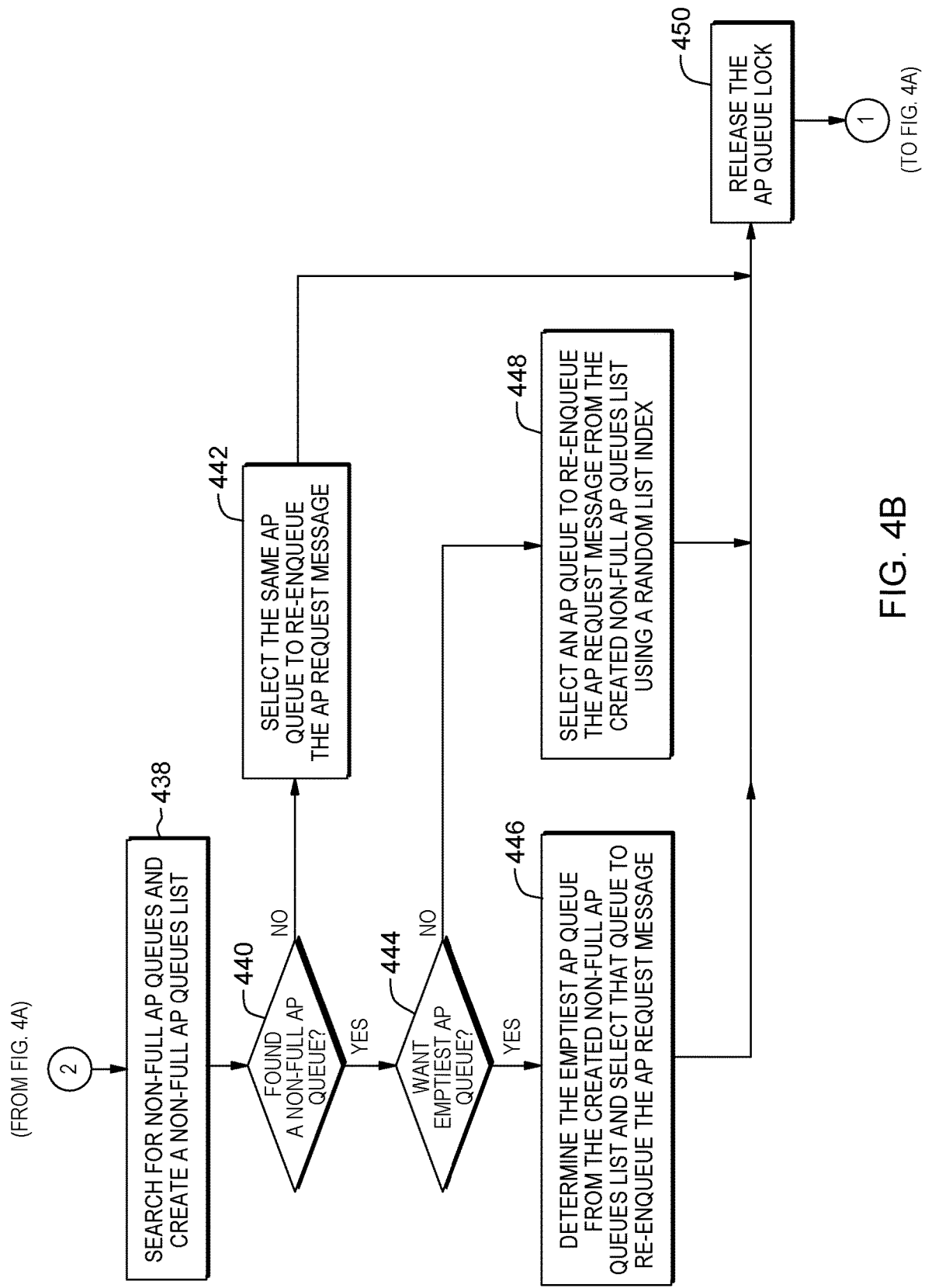

FIGS. 4A & 4B depict a more detailed embodiment of logic for facilitating enqueue-related processing within a computing environment, in accordance with one or more aspects disclosed herein. As noted, the operating system can track numerous items to assist in eliminating software deficiencies. Each tracked item can be grouped for each AP card type and mode. In one or more embodiments, the operating system can determine if a program is a cryptography program based on common cryptography service usage. The cryptography programs use the common cryptography service to get the configured AP queues and their states, to enqueue AP request messages into a configured AP queue, and to dequeue AP reply messages from a configured AP queue. The operating system can track the cryptography programs that were started, have not been terminated, and are currently running. The operating system can also track the cryptography programs that are currently suspended (in pause state). Further, the operating system can keep track of the number of AP messages in each configured AP queue to determine the AP queue full (F) state, as well as an emptiest AP queue. All the tracked items can be shared with the test program(s) via a test program API.

Referring initially to FIG. 4A, the processing starts 400 with selecting an AP queue to enqueue an AP request message 402. As noted, one or more adjunct processor queues (AP queues) can be used to facilitate communication between one or more central processing units and an adjunct process, such as an adjunct processor associated with a cryptography card. The AP request message is enqueued into the selected AP queue until the enqueue is successful or deemed unsuccessful, and times out 404. If there is no enqueue time-out 406, the process ends 408. After a test program times out trying to enqueue an AP request message due to an AP queue full (F) state not going away (reset), processing obtains an AP queue lock 410 to prevent other test program(s) copies from enqueuing more (i.e., new) AP request messages into the AP queue(s) 410.

Processing, implemented for instance at a test program, checks to see of the AP queue full (F) state has been reported 412. If "no", then the AP queue lock is released 414, and processing indicates that the enqueue timed out, but the AP queue full (F) state was not reported, indicative of a likely software error (SE) 416, which completes processing 408. Where the AP queue full (F) state has been reported 412, then processing checks to determine whether the indicated AP queue full (F) state was reported correctly 418, which can be determined based on the number of AP messages that are currently on the AP queue. If the AP queue full (F) state was not correct based on the number of AP messages currently on the AP queue, then the AP queue lock is released 420, and processing indicates that the AP queue full (F) state was reported incorrectly, indicative of a likely hardware error (HE) 422, which completes processing 408. Note that the indicating could include generating an error output with an error message to indicate the erroneous condition, and indicate that the condition is likely due to a hardware error.

Assuming that the AP queue full (F) state is reported correctly 418, then processing checks to see if any of the AP message owners of the AP queue are in suspended state 424. Assuming "no", then processing checks to see of the AP queue is in reply-pending (R) state 426. If the AP queue is not in reply-pending (R) state, which indicates that the AP has not completed processing any of the AP request messages that are currently in the AP queue (e.g., due to a non-responsive adjunct processor), then processing releases the AP queue lock 428, and indicates a request message time-out error that is likely a hardware error (HE) 430, which completes processing 408.

Assuming that the AP queue is in reply-pending (R) state, which indicates that the adjunct process has completed processing at least one of the AP request messages currently in the AP queue (a/k/a, a responsive AP), then the test program releases the AP queue lock 432, dequeues the pending AP reply message(s), and then selects this AP queue to re-enqueue the AP request message 434, before returning to enqueue the AP request message to the selected AP queue 404.

Assuming that there is an AP request message owner in suspended state 424, then an enqueue AP request message time-out can be indicated 436 (optionally), and as shown in FIG. 4B, a search for a non-full AP queue can be undertaken, which can include creating a non-full AP queue list 438. Processing determines whether a non-full AP queue has been found 440. If "no", then the same AP queue is selected to attempt re-enqueuing the AP request message 442, before releasing the AP queue lock 450 and returning to the processing of FIG. 4A to attempt re-enqueuing of the request message.

Assuming that one or more non-full AP queues are found, then, in one or more embodiments, processing determines whether an emptiest AP queue is to be selected 444. If "yes", then the emptiest AP queue from the created non-full AP queue list is determined and selected for re-enqueuing the AP request message 446, before releasing the AP queue lock 450 and returning to re-enqueue the AP request message to the selected queue 404 (FIG. 4A). Otherwise, a queue to re-enqueue the AP request message can be randomly selected from the created non-full AP queue list using, for instance, a random list index 448, before releasing the AP queue lock 450 and returning to re-enqueue the AP request message to the selected queue 404 (FIG. 4A).

Note that the above logic is presented as one example only, and that numerous variations, additions, etc., are possible without departing from the spirit of the present invention.

In one or more embodiments, the process continues until either the AP request message is enqueued successfully, or all the configured AP queues have been searched, but the message was not able to be enqueued on any of them. If all configured AP queues have been searched, and the message is not able to be enqueued on any one of them, then processing could indicate an error by outputting an error message indicating that the enqueue AP request message time-out due to the AP queue full (F) state is not going away (reset), and providing the likely cause, such as a software issue within the computing environment, a hardware issue within the computing environment, a program owner of a message on the queue being in suspended state, or the queue being in reply-pending state.

As noted, the operating system can also be used, instead of a test program, to implement one or more aspects of the processing disclosed herein. For instance, the operating system could inspect various states and take appropriate action(s) just like the test program as described above, since the operating system has all the information and the operating system is one that performs the queueing (enqueue, dequeue, and query) operations on behalf of the cryptography test programs. An input parameter for the queuing API can be used to instruct the cryptography operating system services to keep trying to complete the queuing operation until the operation is successful, or an error, or an operation time-out occurs. In this method, the operating system would report the error, such as via return code, to the test program, and then the test program would inspect the error and, if appropriate, indicate an error output with an error message indicating the operating system reported error.

Advantageously, the queue-related processing disclosed herein substantially eliminates AP request message time-out error when an AP queue full (F) state does not go away (reset) due to various issues described herein. In one or more implementations, the operating system and one or more test programs can work together to gather and inspect various test program states, as well as AP queue states, to determine whether the AP queue full (F) state is due to a software deficiency, and if so, to take appropriate action to assist with correcting the issue. Further, it can be assumed that the AP queue full (F) state not being due to a software deficiency, is due to a hardware issue in certain circumstances described above, in which case, a respective error can be indicated to assist with correcting the issue.

Those skilled in the art will note that various aspects disclosed herein improve the technical field of computer systems by facilitating or assisting in enqueue-related processing, such as during testing of an adjunct processor card, such as an adjunct processor cryptography card. Further, the one or more aspects disclosed herein are inextricably tied to computer technology in that the enqueue-related processes disclosed exist for and relate directly to assisting in enqueuing a request message, such as an AP request message, and/or correcting or repairing any software or hardware deficiencies within the computing environment, or more particularly, associated with the AP card.

One or more aspects may relate to cloud computing.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
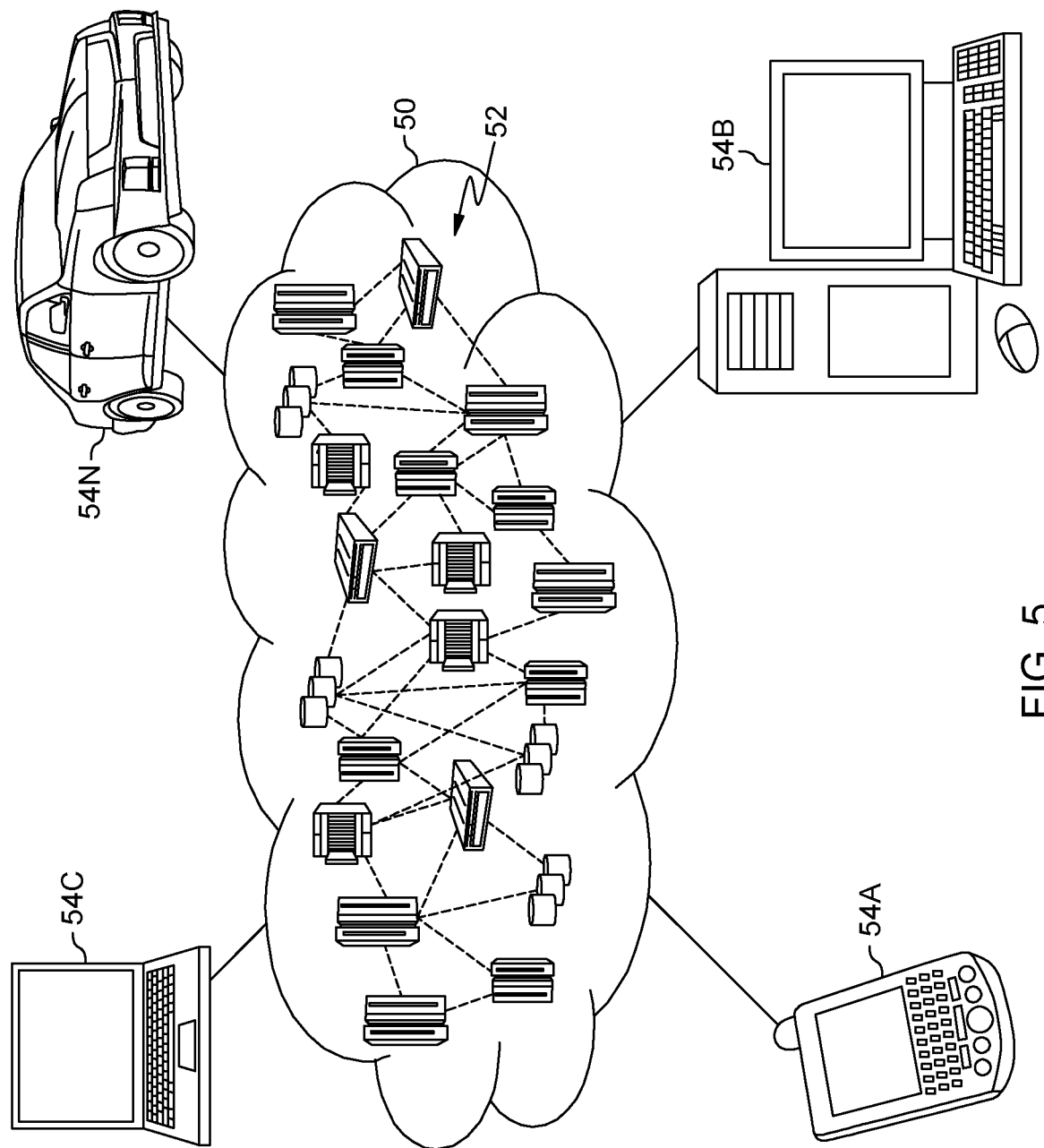
FIG. 5 depicts one embodiment of a cloud computing environment, which can implement, or be used in association with one or more aspects of the present invention.

Referring now to FIG. 5, illustrative cloud computing environment 50 is depicted. As shown, cloud computing environment 50 comprises one or more cloud computing nodes 52 with which local computing devices used by cloud consumers, such as, for example, personal digital assistant (PDA) or cellular telephone 54A, desktop computer 54B, laptop computer 54C, and/or automobile computer system 54N may communicate. Nodes 52 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 12 are intended to be illustrative only and that computing nodes 52 and cloud computing environment 50 can communicate with any type of computerized device over any type of network and/or network addressable connection (e.g., using a web browser).

Figure 6:
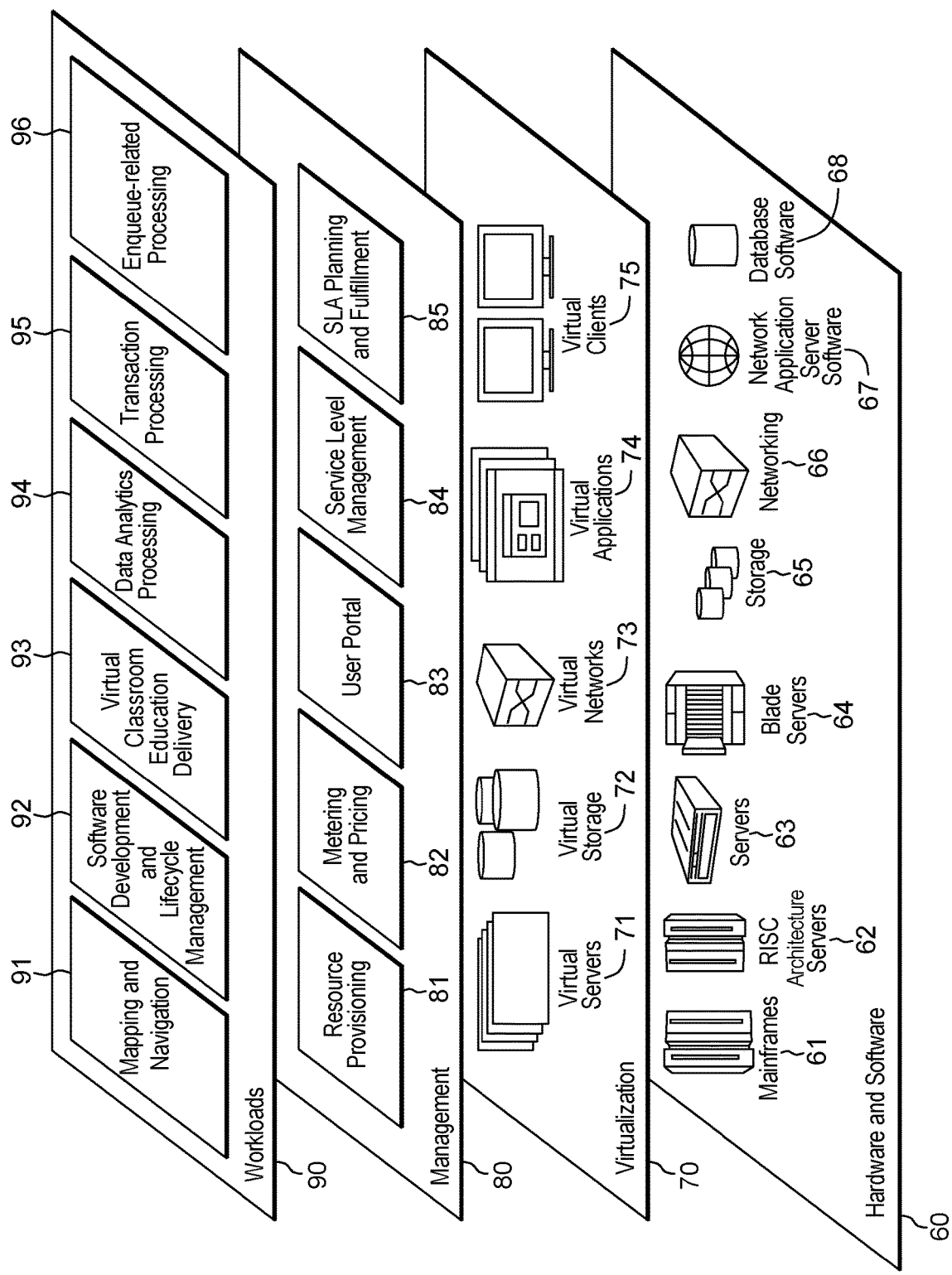
FIG. 6 depicts one example of abstraction model layers, which can facilitate or implements one or more aspects of facilitating processing within a computing environment, in accordance with one or more aspects of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided.

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; enqueue-related processing 96.

Aspects of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, other types of devices and/or tracking components may be used in one or more embodiments. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the invention for various embodiments with various modifications as are suited to the particular use contemplated.

What is claimed is:

1. A computer program product for facilitating enqueue-related processing within a computing environment, the computer program product comprising:
    a computer-readable storage medium readable by a processor and storing instructions for performing a method comprising:
        attempting enqueuing a request message to a queue until timing out, the timing out indicating an unsuccessful enqueuing of the request message;
        based on the enqueuing of the request message timing out, determining a likely cause for the enqueuing being unsuccessful and timing out; and
        based on determining the likely cause, performing one or more actions of facilitate enqueue-related processing within the computing environment.

2. The computer program product of claim 1, wherein determining the likely cause of the enqueuing being unsuccessful and timing out comprises determining whether the timing out is likely due to a reason from the group consisting of software issue within the computing environment, a hardware issue within the computing environment, a program owner of a message on the queue being in suspended state, and the queue being in reply pending state.

3. The computer program product of claim 1, wherein the determining comprises:
    obtaining a lock of the queue;
    determining whether a full-state for the queue has been indicated;
    based on the full-state for the queue not having been indicated, determining that the request message timing out is likely due to a software issue within the computing environment; and
wherein the performing comprises:
    releasing the lock of the queue; and
    providing an indication that the enqueuing was unsuccessful and timed out, and is likely due to a software issue within the computing environment.

4. The computer program product of claim 1, wherein the determining comprises:
    obtaining a lock of the queue;
    determining that a full-state for the queue has been indicated; and
    based on the full-state for the queue having been indicated, determining whether the indicated full-state for the queue was correct.

5. The computer program product of claim 4, wherein the determining further comprises:

based on the indicated full-state for the queue being correct, determining whether a program owner of a message in the queue is in suspended state;

based on the program owner of the message in the queue being in suspended state, identifying that the enqueuing of the request message timing out is likely due to the program owner of the message of the queue being in suspended state; and wherein the performing comprises:

releasing the lock of the queue; and providing an indication that the attempted enqueuing of the request message timing out is due to the program owner of a message on the queue being in suspended state.

6. The computer program product of claim 4, wherein the determining further comprises:

based on the indicated full-state for the queue being correct, determining whether a program owner of a message in the queue is in suspended state;

based on no program owner of a message in the queue being in suspended state, determining whether the queue is in reply-pending state; and based on determining that the queue is not in reply-pending state, determining that the enqueuing timing out is likely due to a hardware issue within the computing environment; and wherein the performing comprises:

releasing the lock of the queue; and providing an indication that the enqueuing of the request message was unsuccessful and timed out, and that the time-out is likely due to a hardware issue within the computing environment.

7. The computer program product of claim 4, wherein the determining further comprises:

based on the indicated full-state for the queue being correct, determining whether a program owner of a message in the queue is in suspended state;

based on no program owner of a message in the queue being in suspended state, determining whether the queue is in reply-pending state; and based on the queue being in reply-pending state, the method further includes:

releasing the lock of the queue; and dequeuing a pending reply message from the queue, and attempting re-enqueuing of the request message to the queue.

8. The computer program product of claim 4, wherein the determining further comprises:

based on the indicated full-state for the queue being correct, determining whether a program owner of a message in the queue is in suspended state;

based on a program owner of a message in the queue being in suspended state, identifying that the enqueuing of the request message timing out is likely due to the program owner of the message of the queue being in suspended state; and wherein the performing comprises:

releasing the lock of the queue; and providing an indication that the attempted enqueuing of the request message timing out is due to the program owner of a message on the queue being in suspended state.

9. The computer program product of claim 8, wherein the method further comprises:

based on identifying that the enqueuing of the request message timing out is likely due to the program owner of message of the queue being in suspended state, identifying any non-full queues; and based on all queues being full, selecting the same queue to re-enqueue the request message, and re-enqueuing the request message to that queue.

10. The computer program product of claim 8, wherein the method further comprises:

based on identifying that the enqueuing of the request message timing out is likely due to the program owner of the message of the queue being in suspended state, determining that there is a non-full queue; and wherein the performing comprises:

re-enqueuing the request message to the non-full queue.

11. The computer program product of claim 10, wherein multiple non-full queues are identified, and wherein the method further comprises:

determining an emptiest queue of the multiple non-full queues, and selecting that emptiest queue; and wherein the performing comprises:

re-enqueuing the request message to the selected queue.

12. The computer program product of claim 10, further comprising:

selecting a queue of the multiple queues to re-enqueue the request message, wherein the selecting utilizes a random list index; and wherein the performing comprises:

re-enqueuing the request message to the selected queue.

13. The computer program product of claim 1, wherein the queue is an adjunct processor queue of one or more adjunct processor queues.

14. A computer system for facilitating enqueue-related processing within a computing environment, the computer system comprising:

a memory; and a processor in communication with the memory, wherein the computer system is configured to perform a method, the method comprising:

attempting enqueuing a request message to a queue until timing out, the timing out indicating an unsuccessful enqueuing of the request message;

based on the enqueuing of the request message timing out, determining a likely cause for the enqueuing being unsuccessful and timing out; and based on determining the likely cause, performing one or more actions to facilitate enqueue-related processing within the computing environment.

15. The computer system of claim 14, wherein the determining comprises:

obtaining a lock of the queue;

determining that a full-state for the queue has been indicated; and based on the full-state for the queue having been indicated, determining whether the indicated full-state for the queue was correct.

16. The computer system of claim 15, wherein the determining further comprises:

based on the indicated full-state for the queue being correct, determining whether a program owner of a message in the queue is in suspended state;

based on no program owner of a message in the queue being in suspended state, determining whether the queue is in reply-pending state; and based on the queue being in reply-pending state, the method further includes:

releasing the lock of the queue; and dequeuing a pending reply message from the queue, and attempting re-enqueuing of the request message to the queue.

17. The computer system of claim 15, wherein the determining further comprises:

based on the indicated full-state for the queue being correct, determining whether a program owner of a message in the queue is in suspended state;

based on the program owner of the message in the queue being in suspended state, identifying that the enqueuing of the request message timing out is likely due to the program owner of the message of the queue being in suspended state; and wherein the performing comprises:

releasing the lock of the queue; and providing an indication that the attempted enqueuing of the request message timing out is due to the program owner of a message on the queue being in suspended state.

18. The computer system of claim 17, wherein the method further comprises:

based on identifying that the enqueuing of the request message timing out is likely due to the program owner of message of the queue being in suspended state, identifying any non-full queues; and based on all queues being full, selecting the same queue to re-enqueue the request message, and re-enqueuing the request message to that queue.

19. The computer system of claim 17, wherein the method further comprises:

based on identifying that the enqueuing of the request message timing out is likely due to the program owner of the message of the queue being in suspended state, determining that there is a non-full queue; and wherein the performing comprises:

re-enqueuing the request message to the non-full queue.

20. A method of enqueue-related processing within a computing environment, the method comprising:

attempting enqueuing a request message to a queue until timing out, the timing out indicating an unsuccessful enqueuing of the request message;

based on the enqueuing of the request message timing out, determining a likely cause for the enqueuing being unsuccessful and timing out; and based on determining the likely cause, performing one or more actions to facilitate enqueue-related processing within the computing environment.

* * * * *